United States Patent
Jung et al.

(10) Patent No.: US 10,606,521 B2
(45) Date of Patent: *Mar. 31, 2020

(54) MEMORY SYSTEM AND OPERATING METHOD THEREOF

(71) Applicant: SK hynix Inc., Gyeonggi-do (KR)

(72) Inventors: In Jung, Gyeonggi-do (KR); Soo Nyun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,896

(22) Filed: Nov. 13, 2018

(65) Prior Publication Data

US 2019/0095139 A1    Mar. 28, 2019

Related U.S. Application Data

(63) Continuation of application No. 14/835,369, filed on Aug. 25, 2015, now Pat. No. 10,126,986.

(30) Foreign Application Priority Data

Mar. 24, 2015  (KR) .................. 10-2015-0040689

(51) Int. Cl.
*G06F 12/00* (2006.01)
*G06F 3/06* (2006.01)
*G06F 12/02* (2006.01)

(52) U.S. Cl.
CPC .......... *G06F 3/0679* (2013.01); *G06F 3/0613* (2013.01); *G06F 3/0656* (2013.01); *G06F 12/0246* (2013.01); *G06F 2212/1016* (2013.01); *G06F 2212/7201* (2013.01); *G06F 2212/7203* (2013.01)

(58) Field of Classification Search
CPC .... G06F 3/0679; G06F 3/0613; G06F 3/0656; G06F 3/0246; G06F 2212/7201; G06F 2212/1016; G06F 2212/7203
See application file for complete search history.

(56) References Cited

U.S. PATENT DOCUMENTS

| 10,126,986 B2 | 11/2018 | Jung et al. |
| 2008/0104309 A1 | 5/2008 | Cheon et al. |
| 2012/0144095 A1 | 6/2012 | Han et al. |

(Continued)

FOREIGN PATENT DOCUMENTS

| KR | 1020120061575 | 6/2012 |
| KR | 1020120119092 | 10/2012 |
| KR | 1020160114337 | 10/2016 |

*Primary Examiner* — Arvind Talukdar
(74) *Attorney, Agent, or Firm* — Kilpatrick Townsend & Stockton LLP (57) ABSTRACT

A memory system includes: a flash translation layer block suitable for receiving data from a host and converting a logic address into a physical address to store address information, during a write operation; a first buffer unit suitable for sequentially receiving the data from the flash translation layer; and a second buffer unit suitable for randomly receiving the data from the flash translation layer, wherein the flash translation layer block outputs data to only one of the first and second buffer units in a fast write mode during the write operation, and updates mapping information on the data stored in the one of the first and second buffer units after the fast write mode is terminated.

20 Claims, 6 Drawing Sheets

(56) References Cited

U.S. PATENT DOCUMENTS

| | | | |
|---|---|---|---|
| 2012/0246392 A1* | 9/2012 | Cheon | G06F 12/0871 |
| | | | 711/103 |
| 2014/0365449 A1* | 12/2014 | Chambliss | G06F 3/0641 |
| | | | 707/692 |
| 2016/0036912 A1* | 2/2016 | Nishibori | G06F 12/0813 |
| | | | 709/203 |
| 2016/0092138 A1* | 3/2016 | Knestele | G06F 3/0619 |
| | | | 711/103 |
| 2016/0283395 A1 | 9/2016 | Jung et al. | |

* cited by examiner

MEMORY SYSTEM AND OPERATING METHOD THEREOF

CROSS-REFERENCE TO RELATED APPLICATION

This application is a continuation application of U.S. patent application Ser. No. 14/835,369 filed on Aug. 25, 2015, which claims priority to Korean patent application number 10-2015-0040689 filed on Mar. 24, 2015, in the Korean Intellectual Property Office. The disclosure of each of the foregoing applications is incorporated by reference.

BACKGROUND

1. Field

Various embodiments of the invention relate to a memory system, and more particularly, to a memory system capable of improving operation speed, and an operating method thereof.

2. Discussion of Related Art

Portable electronic devices use files having large volume, such as audio and video files, so that memory systems need to have a large amount of storage capacity. Memory systems include multiple memory devices to increase storage capacity. In memory systems with memory devices, fast operation speed is an important characteristic.

Memory devices present in memory systems may be implemented using semiconductors such as silicon (Si), germanium (Ge), gallium arsenide (GaAs), and indium phosphide (InP). Semiconductor memory devices are generally classified into volatile memory devices and nonvolatile memory devices.

Volatile memory devices lose data stored therein when their power supply is blocked. Volatile memory devices include Static RAM (SRAM), Dynamic RAM (DRAM), Synchronous DRAM (SDRAM), and the like. Nonvolatile memory devices can retain stored data even without a constant source of power. Nonvolatile memory devices include Read Only Memory (ROM), Programmable ROM (PROM), Electrically Programmable ROM (EPROM), Electrically Erasable and Programmable ROM (EEPROM), flash memory, Phase-change RAM (PRAM), Magnetic RAM (MRAM), Resistive RAM (RRAM), Ferroelectric RAM (FRAM), and the like. Flash memory may be divided into the NOR type and the NAND type.

SUMMARY

Various embodiments of the invention are directed to a memory system capable of improving operation speed when a fast write command is input from a host during a normal write operation, and an operating method thereof.

In an embodiment of the invention, a memory system includes: a flash translation layer block suitable for receiving data from a host and converting a logic address into a physical address to store address information, during a write operation; a first buffer unit suitable for sequentially receiving the data from the flash translation layer; and a second buffer unit suitable for randomly receiving the data from the flash translation layer, wherein the flash translation layer block outputs data to only one of the first and second buffer units in a fast write mode during the write operation, and updates mapping information on the data stored in the one of the first and second buffer units after the fast write mode is terminated.

In an embodiment of the invention, a memory system includes: a flash translation layer block suitable for receiving data from a host through a host channel; a buffer block suitable for receiving the data converted in the flash translation layer block to store the data; and a NAND chip group suitable for receiving the data stored in the buffer block through an internal channel to program the data, wherein the flash translation layer block skips a mapping information update operation for the data stored in the buffer block in a fast write mode, and performs the mapping information update operation after the fast write mode is terminated.

In an embodiment of the invention, a method of operating a memory system includes: receiving data from a host and converting a logic address into a physical address to store address information, during a write operation; storing the received data in a buffer block; updating mapping information on the data stored in the buffer unit, in a normal write mode during the write operation; and programming the data stored in the buffer unit in a memory chip while skipping a mapping information update operation on the data stored in the buffer unit, in a fast write mode during the write operation.

DETAILED DESCRIPTION

Various advantages and features of the invention and methods accomplishing thereof will become apparent from the following description of embodiments with reference to the accompanying drawings. However, the invention is not limited to the embodiments described herein, and may be implemented in other forms. However, the present embodiments are provided for describing the invention in detail so that those skilled in the art may easily practice the technical spirit of the invention.

Throughout this specification and the claims that follow, when it is described that an element is "coupled" to another element, the element may be "directly coupled" to the other element or "electrically coupled" to the other element through a third element. Throughout the specification and the claims, unless explicitly stated otherwise, the word "comprise" and variations such as "comprises" or "comprising" will be understood to imply the inclusion of stated elements but not the exclusion of any other elements.

Figure 1:
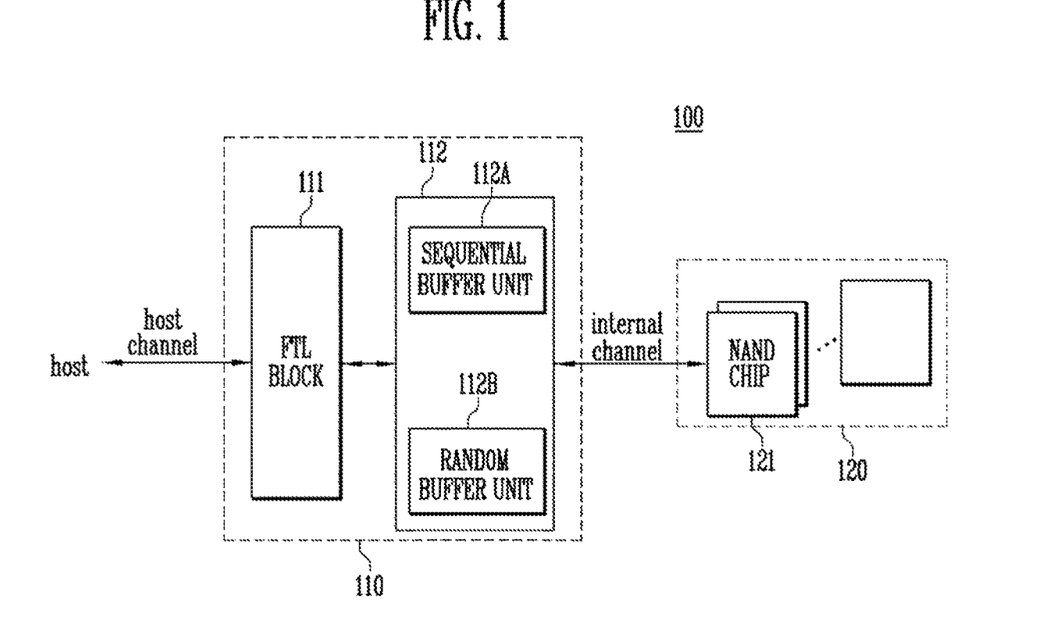
FIG. 1 is a block diagram illustrating a memory system according to an embodiment of the invention.

FIG. 1 is a block diagram illustrating a memory system 100 according to an embodiment of the invention.

Referring to FIG. 1, the memory system 100 may include a controller 110 and a NAND chip group 120.

The controller 110 may include a flash translation layer (FTL) block 111 and a buffer block 112. The buffer block 112 may include a sequential buffer unit 112A and a random buffer unit 112B.

The FTL block 111 is connected to a host through a host channel, converts a logic address corresponding to data input from the host into a physical address for the NAND chip group 120 during a data input operation, and performs a requested operation according to the converted physical address. The FTL block 111 may selectively output data, for which an address conversion operation is completed, to the sequential buffer unit 112A or the random buffer unit 112B. For example, when the size of sequentially input data is larger than 16 kB, the FTL block 111 may input the data into the sequential buffer unit 112A and the random buffer unit 112B, and when a size of sequentially input data is less than or equal to 16 kB, the FTL block 111 may input the data to the random buffer unit 112B.

Further, the FTL block 111 checks whether there are data corresponding to the same address by comparing addresses for the data stored in the sequential buffer unit 112A and the random buffer unit 112B before a data read-back operation is performed. When there are data corresponding to the same address, the FTL block 111 invalidates the data and updates mapping information, thereby preventing an error of the read-back operation.

The sequential buffer unit 112A may sequentially receive and store the data converted by the FTL block 111, and the random buffer unit 112B may randomly receive and store the data converted by the FTL block 111. For example, the random buffer unit 112B may be used when the size of data input from the host is smaller than a predetermined value (for example, 16 kB), and the sequential buffer unit 112A and the random buffer unit 112B may be used when a size of data input from the host is larger than the predetermined value.

The data stored in the sequential buffer unit 112A and the random buffer unit 112B may be transmitted to the NAND chip group 120 through an internal channel during a write operation and programmed in memory cells included in the NAND chip group 120.

The NAND chip group 120 may include a plurality of NAND chips, and the NAND chips may be formed of NAND flash memory devices. Further, the NAND chip group 120 may be formed of other nonvolatile memory devices. That is, the NAND chip group 120 may be formed of any one of various types of non-volatile memory devices, such as a NOR flash memory device, a Ferroelectric RAM (FRAM) using a ferroelectric capacitor, a magnetic RAM (MRAM) using a Tunneling Magneto-Resistive (TMR) layer, a Phase Change Memory Device (PRAM) using chalcogenide alloys, and a Resistive Memory Device (RE-RAM) using a transition metal oxide.

Figure 2:
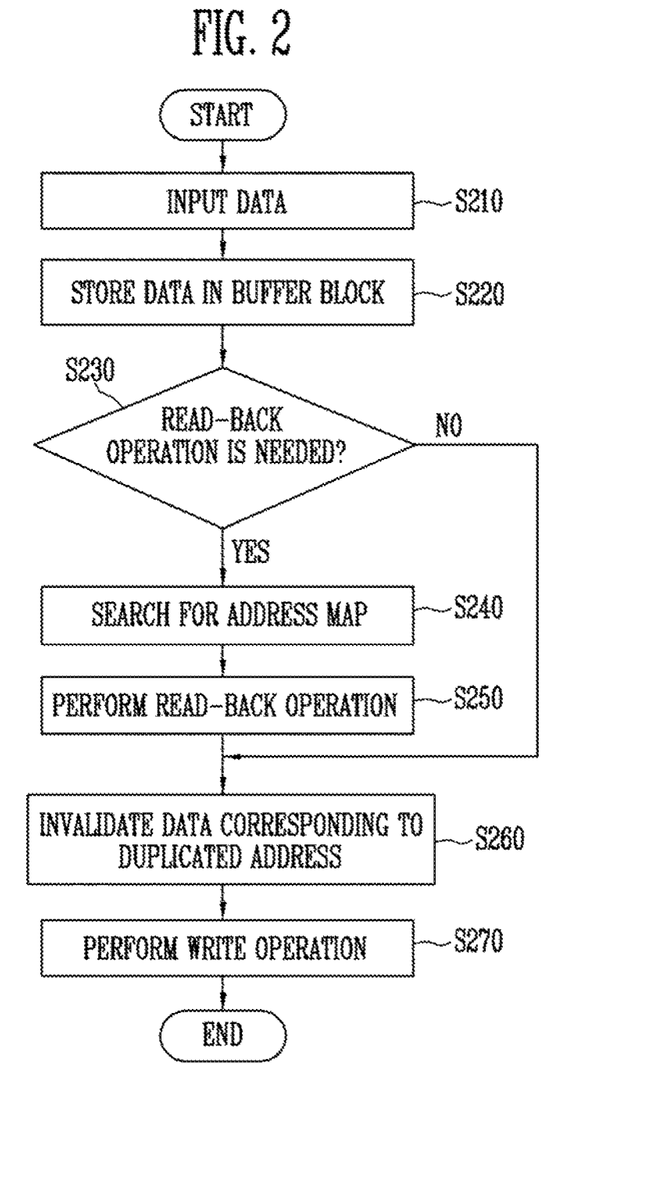
FIG. 2 is a flowchart for describing a normal write operation of the memory system shown in FIG. 1.

FIG. 2 is a flowchart for describing a normal write operation of the memory system shown in FIG. 1.

A normal write operation of the memory system will be described with reference to FIGS. 1 and 2.

1) Input data (S210)

In a data input operation, data are sequentially input from the host to the controller 110 through the host channel. In this case, logic addresses for the data are input along with the data.

2) Store the data in the buffer block (S220)

The FTL block 111 converts the logic addresses for the data input from the host into physical addresses, and performs a requested operation according to the converted physical addresses. The data, for which the addresses are converted, is stored in the sequential buffer unit 112A and the random buffer unit 112B of the buffer block 112.

3) Determine whether a read-back operation is needed (S230)

When the address conversion operation is completed, and then a write request on the address designated by the host is made, the FTL block 111 determines whether a read-back operation is needed. That is, the FTL block 111 checks whether the designated address is appropriate to a unit of write set in the memory system. For example, when the unit of write is 4 k, the FTL block 111 needs to perform the read-back operation to newly configure a write address in a unit of 4 k including the designated address.

4) Search for an address map (S240).

When it is determined that the read-back operation is needed, the FTL block 111 searches for the converted addresses for the data stored in the sequential buffer unit 112A and the random buffer unit 112B, and maps addresses for the data.

5) Perform the read-back operation (S250)

The FTL block 111 performs the read-back operation to newly configure the write address for a unit of 4 k including the designated address. In this case, an address corresponding to data to be read may be adjacent to the designated address.

6) Invalidate DATA corresponding to a duplicated address (S260)

When there are data corresponding to a duplicated address as a result of the operation S240 of searching for the address map, the FTL block 111 invalidates corresponding data of the sequential buffer unit 112A and the random buffer unit 112B, and removes the data corresponding to the duplicated address to update mapping information.

7) Perform a write operation (S270)

The data stored in the sequential buffer unit 112A and the random buffer unit 112B is transmitted to the NAND chip group 120 through the internal channel and programmed in memory cells included in the NAND chip group 120.

The memory system stores data by using the sequential buffer unit 112A and the random buffer unit 112B included in the buffer block 112 together during the normal write operation, and then transmits the data to the NAND chip group 120, checks whether addresses for the data stored in the sequential buffer unit 112A and the random buffer unit 112B are duplicated, invalidates the data, for which the addresses are duplicated, and updates the mapping information, thereby preventing an error during the write operation.

Figure 3:
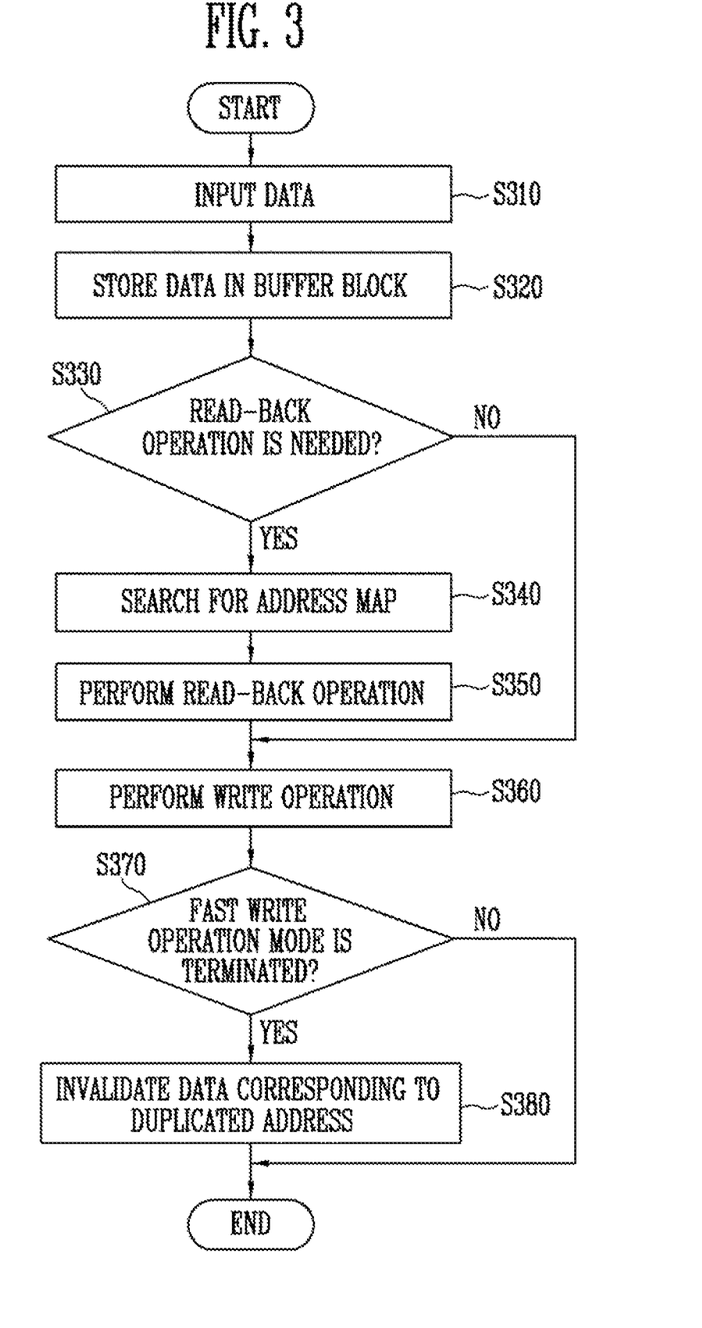
FIG. 3 is a flowchart for describing a fast write operation of the memory system shown in FIG. 1.

FIG. 3 is a flowchart for describing a fast write operation of the memory system shown in FIG. 1.

A fast write operation of the memory system will be described with reference to FIGS. 1 and 3.

1) Input data (S310)

In a data input operation, data are sequentially input from the host to the controller 110 through the host channel. In this case, logic addresses for the data are input along with the data.

2) Store the data in the buffer block (S320)

The FTL block 111 converts the logic addresses for the data input from the host into physical addresses, and performs a requested operation according to the converted physical addresses. The data, for which the addresses are converted, is stored in the random buffer unit 112B of the buffer block 112.

3) Determine whether a read-back operation is needed (S330)

When the address conversion operation is completed, and then a write request on the address designated from the host is made, the FTL block 111 determines whether a read-back operation is needed. That is, the FTL block 111 checks whether the designated address is appropriate to a unit of write set in the memory system. For example, when a unit of write set in the memory system is 4 k, the FTL block 111 needs to perform the read-back operation to newly configure a write address in a unit of 4 k including the designated address.

4) Search for an address map (S340)

When it is determined that the read-back operation is needed, the FTL block 111 searches for the converted addresses of the data stored in the sequential buffer unit 112A and the random buffer unit 112B, and maps addresses for the data.

5) Perform the read-back operation (S350)

The FTL block 111 performs the read-back operation to newly configure the write address for a unit of 4 k including the designated address. In this case, an address corresponding to data to be read may be adjacent to the designated address.

6) Perform a fast write operation (S360)

The data stored in the random buffer unit 112B is transmitted to the NAND chip group 120 through the internal channel and programmed in memory cells included in the NAND chip group 120.

7) Check PON/operation mode change (S370)

It is confirmed whether a fast write mode is terminated. That is, it is checked whether a PON signal is activated during the fast write mode or whether the fast write mode is changed to a normal write mode. The PON signal is activated when a power off state is converted into an on-state.

8) Invalidate data corresponding to a duplicated address (S380)

When the PON signal is activated or the fast write mode is changed to the normal write operation by the host at step S370, the FTL block 111 checks whether there is a duplicated address by comparing a converted address for the data stored in the sequential buffer unit 112A, which is used during the normal write mode performed before the fast write mode, with a converted address for the data stored in the random buffer unit 112B used in the fast write mode. When there is a duplicated address, the FTL block 111 invalidates corresponding data and updates the mapping information.

As described above, the memory system may store data by using any one buffer unit (i.e., random buffer unit) of the buffer block 112 during the fast write operation, and then transmit the stored data to the NAND chip group 120. Accordingly, it is possible to skip the operation of invalidating data corresponding to the duplicated address, so that an operation speed of the fast write operation is faster than that of the normal write operation. Then, when the fast write operation is terminated, and the operation mode is changed to the normal write operation, the memory system updates the mapping information by invalidating data corresponding to the duplicated address, thereby preventing an error during the write operation.

Figure 4:
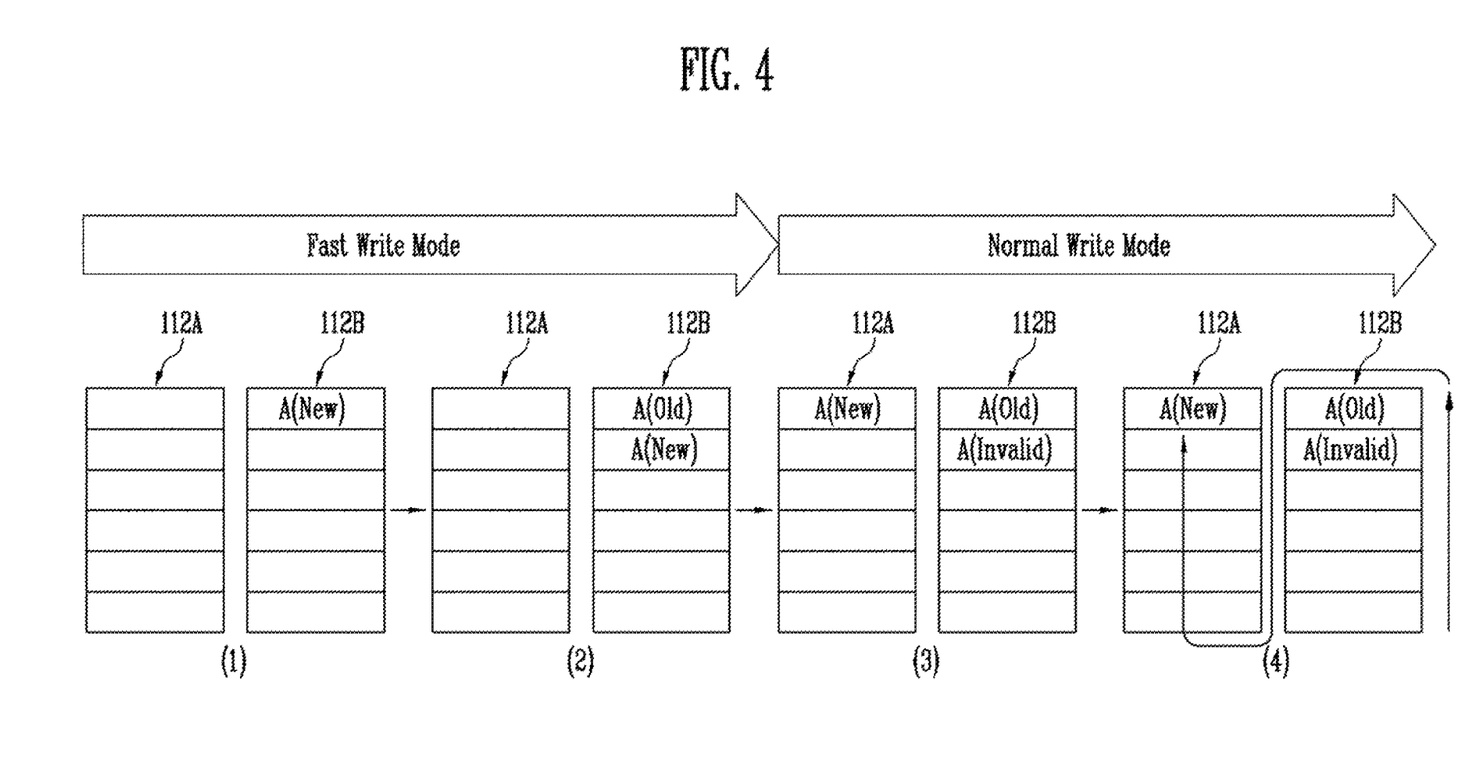
FIG. 4 is a diagram for describing an operation of a buffer block when a fast write mode is converted into a normal write mode.

FIG. 4 is a diagram for describing an operation of the buffer block 112 when the fast write mode is converted into the normal write mode.

Referring to FIG. 4, when the fast write operation is performed by the host, one buffer unit (i.e., the random buffer unit 112B) of the sequential buffer unit 112A and the random buffer unit 112B is selected, so that new data A(New) is stored (1). Then, when next data is input, the new data A(New) is stored in a next region of previously stored data A(OLD) (2). As described above, in the fast write mode, the data is stored by using only the random buffer unit 112B.

Then, when a PON signal is activated or the fast write mode is changed to the normal write mode by the host, the FTL 111 performs the data storage operation by using both of the sequential buffer unit 112A and the random buffer unit 112B, and the newly input new data A(New) may be sequentially stored in the sequential buffer unit 112A. In this case, when a converted address for the stored new data A(New) is the same as a converted address for the data stored in the random buffer unit 112B, the FTL 111 invalidates the data stored in the random buffer unit 112B to prevent the address for the data from being duplicated (3). Then, the read operation is performed in an order from the previous data A(Old) stored in the random buffer unit 112B to the new data A(New) stored in the sequential buffer unit 112A, during the read operation (4).

According to the embodiments of the invention, when a fast write command is input from a host during a normal write operation, a data buffering operation is performed by using only the random buffer unit, and an operation of checking whether an address corresponding to the data of the random buffer unit is identical to an address corresponding to the data of the sequential buffer unit may be skipped, thereby improving operation speed.

Figure 5:
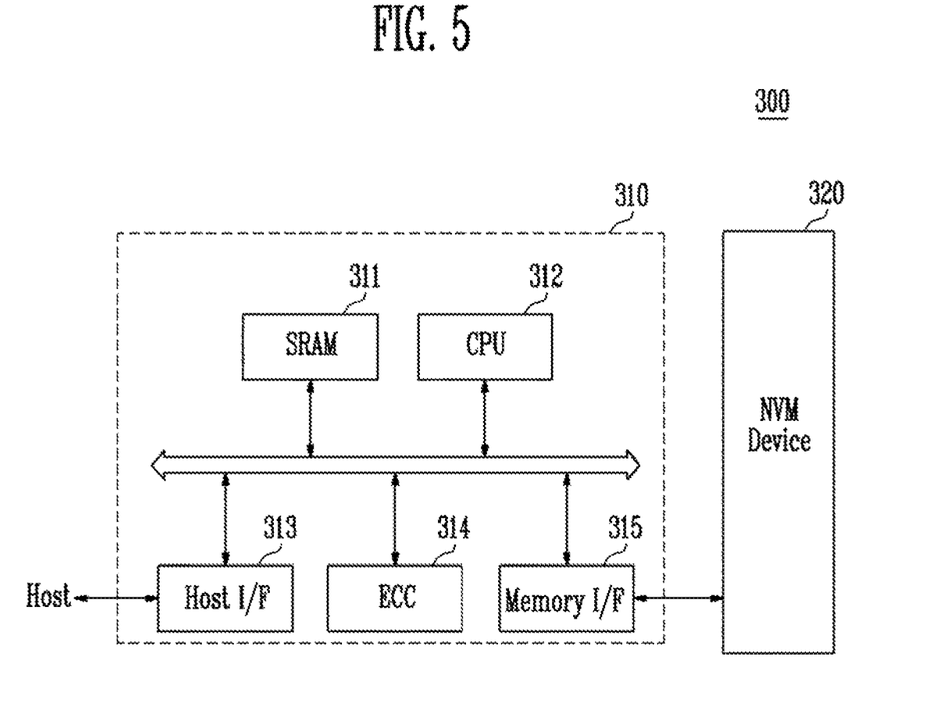
FIG. 5 is a block diagram illustrating a memory system according to an embodiment of the invention.

FIG. 5 is a block diagram illustrating a memory system 300 according to an embodiment of the invention.

Referring to FIG. 5, the memory system 300 may include a nonvolatile memory device 320 and a memory controller 310.

The nonvolatile memory device 320 may be formed of a semiconductor device including the NAND chips shown in FIG. 1. The memory controller 310 may control the controller 310 shown in FIG. 1 and the nonvolatile memory device 320. A memory card or a semiconductor disk device (e.g., a Solid State Disk: SSD) may be provided by a combination of the nonvolatile memory device 320 and the memory controller 310. An SRAM 311 is used as an operation memory of the processing unit 312.

A host interface (I/F) 313 includes a data exchange protocol of a host connected with the memory system 300. An error correction block (ECC) 314 detects and corrects an error included in the data read from the nonvolatile memory device 320. The memory interface 315 may include a flash translation layer and a buffer block including a plurality of buffer units similar to the controller 110 illustrated in FIG. 1, and interfaces the non-volatile memory device 320. Further, the memory interface 313 interfaces the nonvolatile memory device 320 at the time of a data input operation and a data output operation similar to the controller 110 illustrated in FIG. 1, and enables the normal write operation and the fast write operation to be performed, thereby improving operation speed.

Although it is not illustrated in the drawings, it is apparent to those skilled in the art that the memory system 300 may further include a ROM (not shown) storing code data for interfacing with the host. The nonvolatile memory device 320 may also be provided in a form of a multi-chip package including a plurality of flash memory chips. The memory system 300 may be provided as a storage medium having a low error generation probability and high reliability. Especially, the flash memory device may be included in a memory system, such as a semiconductor disk device (e.g., an SSD). In this case, the memory controller 310 may communicate with an external device (for example, the host) through one of various interface protocols, such as USB, MMC, PCI-E, SATA, PATA, SCSI, ESDI, and IDE.

Figure 6:
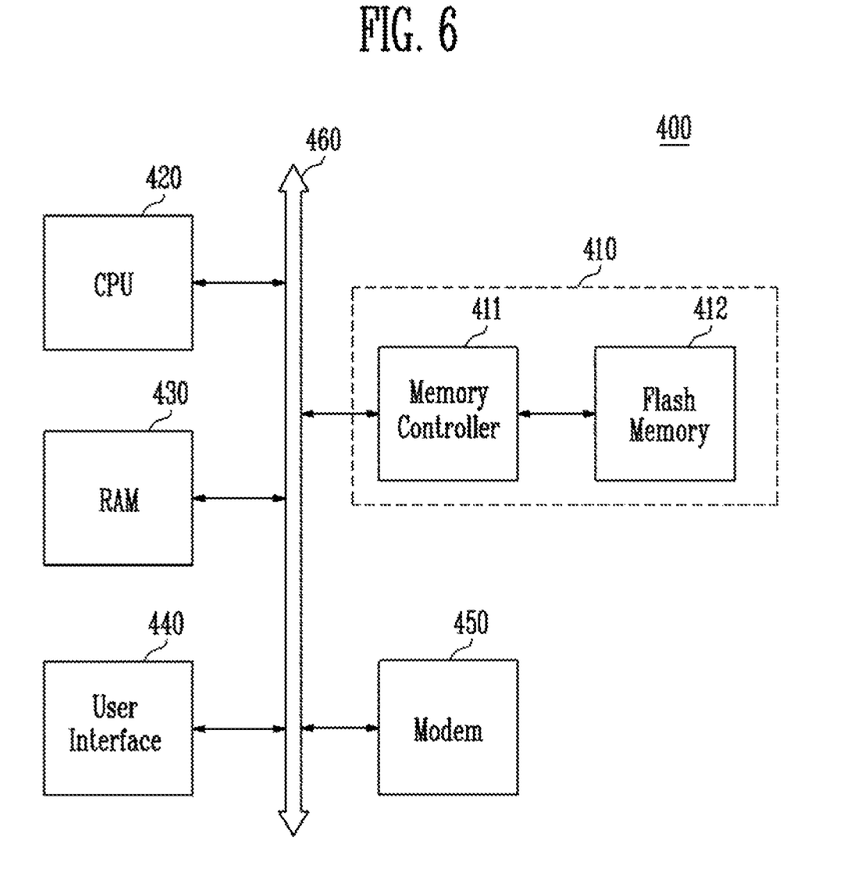
FIG. 6 is a block diagram illustrating a computing system according to an embodiment of the invention.

FIG. 6 a block diagram illustrating a computing system 400 according to an embodiment of the invention.

The computing system 400 may include a microprocessor 420, a RAM 430, a user interface 440, a modem 450, such as a baseband chipset, and a memory system 410 electrically connected to a system bus 460. When the computing system 400 is a mobile device, a battery (not shown) for supplying an operating voltage to the computing system 400 may be further provided. Although it is not illustrated in the drawing, it is apparent to those skilled in the art that the computing system 400 may further include an application chipset, a Camera Image Processor, a mobile DRAM, and the like. The memory system 410 may further include, for example, an SSD using a nonvolatile memory for storing data. Otherwise, the memory system 310 may be provided as a fusion flash memory (for example, a OneNAND flash memory).

The memory system 410 may include a memory controller 411 and a flash memory device 412, and the memory controller 411 may have the same configuration as the controller 110 illustrated in FIG. 1 to interface with the memory device 412 during a data input operation and a data output operation, and enable a normal write operation and a fast write operation to be performed, thereby improving operation speed.

The above-mentioned embodiments of the invention are not limited to being an apparatus or a method. Alternatively, the above-mentioned embodiments be implemented by a program performing functions, which correspond to the configuration of the embodiments of the invention, or a recording medium in which the program is recorded. These embodiments can be easily devised from the description of the above-mentioned embodiments by those skilled in the art to which the invention pertains.

As described above, the embodiments have been disclosed in the drawings and the specification. The specific terms used herein are for illustration and do not limit the scope of the invention as defined in the claims. Accordingly, those skilled in the art will appreciate that various modifications and equivalent examples may be made without departing from the scope and spirit of the present disclosure. Therefore, the scope of the invention is defined by the technical spirit of the accompanying claims.

What is claimed is:

1. A device comprising:
a semiconductor memory; and
a memory controller having a buffer block including a random buffer unit and a sequential buffer unit, the memory controller programmable to switch between a normal write mode that uses both the random buffer unit and the sequential buffer unit for writing to the semiconductor memory, and a fast write mode that uses the random buffer unit and not the sequential buffer unit for writing to the semiconductor memory,
wherein in the normal write mode, the memory controller is configured to compare an address of data stored in the sequential buffer unit and an address of data stored in the random buffer unit, perform a duplicated address invalidation operation to invalidate the data in the random buffer unit having the same address and update mapping information for the data stored in the buffer block, and write to the semiconductor memory, and
wherein in the fast write mode, the memory controller is configured to write to the semiconductor memory without performing the duplicated address invalidation operation.

2. The device of claim 1, wherein the memory controller is programmed to operate in the normal write mode when write data received from a host is greater than a predetermine data size.

3. The device of claim 1, wherein the memory controller is programmed to operate in the fast write mode when write data received from a host is less than or equal to a predetermine data size.

4. The device of claim 1, wherein the memory controller switches from the fast write mode to the normal write mode when a power signal is activated.

5. The device of claim 1, wherein the memory controller is configured to convert a logic address associated with write data from a host to a physical address.

6. The device of claim 1, wherein the semiconductor memory includes a NAND flash memory.

7. A method comprising:
performing a write operation to a semiconductor memory in a fast write mode that uses a random buffer unit of a buffer block but not a sequential buffer unit of the buffer block, wherein the semiconductor memory is operable in the fast write mode without a duplicated address invalidation operation;
switching from the fast write mode to a normal write mode that uses both the random buffer unit and the sequential buffer unit of the buffer block; and
subsequent to switching to the normal write mode:
comparing an address of data stored in the sequential buffer unit and an address of data stored in the random buffer unit;
performing the duplicated address invalidation operation to invalidate the data having the same address in the random buffer unit; and
updating mapping information for the data stored in the buffer block.

8. The method of claim 7, further comprising:
determining a read-back operation is needed to complete the write operation; and
performing the read-back operation prior to writing the data to the semiconductor memory.

9. The method of claim 8, wherein the read-back operation reads data adjacent to a designated address of the write operation.

10. The method of claim 7, further comprising:
converting a logic address associated with write data from a host to a physical address.

11. The method of claim 7, wherein the normal write mode is used when write data received from a host is greater than a predetermined data size.

12. The method of claim 7, wherein the fast write mode is used when write data received from a host is less than or equal to a predetermined data size.

13. The method of claim 7, wherein the switching from the fast write mode to the normal write mode is in response to activation of a power signal.

14. A device comprising:
a semiconductor memory; and
a memory controller having a buffer block including a first buffer unit and a second buffer unit, the memory controller programmable to switch between a first write mode that uses both the first and second buffer units for writing to the semiconductor memory, and a second write mode that uses the first buffer unit and not the second buffer unit for writing to the semiconductor memory,
wherein in the first write mode, the memory controller is configured to compare an address of data stored in the first buffer unit and an address of data stored in the second buffer unit, perform a duplicated address invalidation operation to invalidate the data in the first buffer unit having the same address and update mapping information for the data stored in the buffer block, and write to the semiconductor memory, and wherein in the second write mode, the memory controller is configured to write to the semiconductor memory without performing the duplicated address invalidation operation.

15. The device of claim 14, wherein the memory controller is programmed to operate in the first write mode when write data received from a host is greater than a predetermined data size.

16. The device of claim 14, wherein the memory controller is programmed to operate in the second write mode when write data received from a host is less than or equal to a predetermined data size.

17. The device of claim 14, wherein the memory controller switches from the second write mode to the first write mode when a power signal is activated.

18. The device of claim 14, wherein the memory controller is configured to convert a logic address associated with write data from a host to a physical address.

19. The device of claim 14, wherein the semiconductor memory includes a NAND flash memory.

20. The device of claim 14, wherein writing to the semiconductor memory in the second write mode is faster than writing to the semiconductor memory in the first write mode.

* * * * *